(12) United States Patent
Posthuma et al.

(10) Patent No.: US 12,193,092 B2
(45) Date of Patent: Jan. 7, 2025

(54) CONTROL OF CONNECTIVITY BETWEEN A SATELLITE AND A WIDE AREA NETWORK USING A COMMON CONTROL PLANE

(71) Applicant: Kymeta Corporation, Redmond, WA (US)

(72) Inventors: Benjamin Posthuma, Gig Harbor, WA (US); Neville Meijers, Bellevue, WA (US); Maxwell Smoot, Seattle, WA (US); Luis Varela, Kirkland, WA (US)

(73) Assignee: Kymeta Corporation, Redmond, WA (US)

( * ) Notice: Subject to any disclaimer, the term of this patent is extended or adjusted under 35 U.S.C. 154(b) by 343 days.

(21) Appl. No.: 17/747,478

(22) Filed: May 18, 2022

(65) Prior Publication Data
US 2022/0386400 A1    Dec. 1, 2022

Related U.S. Application Data

(60) Provisional application No. 63/194,463, filed on May 28, 2021.

(51) Int. Cl.
| | | |
|---|---|---|
| H04W 76/15 | (2018.01) | |
| H04W 36/14 | (2009.01) | |
| (Continued) | | |

(52) U.S. Cl.
CPC ......... *H04W 76/15* (2018.02); *H04W 36/144* (2023.05); *H04W 36/18* (2013.01); *H04W 40/36* (2013.01); *H04W 84/06* (2013.01)

(58) Field of Classification Search
CPC . H04W 76/15; H04W 36/0069; H04W 36/18; H04W 40/36; H04W 84/06;
(Continued)

(56) References Cited

U.S. PATENT DOCUMENTS

2012/0322483 A1\* 12/2012 Ji et al. ................. 455/509
2018/0049153 A1    2/2018 Sheynblat et al.
(Continued)

FOREIGN PATENT DOCUMENTS

WO    2020154681 A1    7/2020

OTHER PUBLICATIONS

Rasonen et al. (CN 102457899 A) >>> Improved Common Control Channel Operation (see title) (Year: 2012).\*
(Continued)

*Primary Examiner* — Meless N Zewdu
(74) *Attorney, Agent, or Firm* — Womble Bond Dickinson (US) LLP

(57) ABSTRACT

A wide area network (WAN) communication framework having a common control plane and method for using the same are disclosed. In some embodiments, the wide area network (WAN) communication framework comprises: a plurality of management systems, each for controlling access to and traffic for one of a plurality of WANs that include satellite and terrestrial communication networks; a remote unit capable of communicably coupling to the plurality of WANs; and a master network management system (MNMS). The MNMS is communicably coupled to the plurality of management systems and coupled to the remote unit to aggregate control information from the plurality of management systems and the remote unit to determine which WANs of the plurality of WANs for the remote unit to use, wherein the MNMS uses a common control plane communicably coupled to the remote unit for control and routing of control traffic, including information indicating which WANs of the plurality of WANs to which the remote terminal can connect, the common control plane including a single, continuous control channel to which the remote
(Continued)

terminal is connectable simultaneously with a connection to a WAN of the plurality of WANs.

24 Claims, 7 Drawing Sheets

(51) Int. Cl.
*H04W 36/18* (2009.01)
*H04W 40/36* (2009.01)
*H04W 84/06* (2009.01)

(58) Field of Classification Search
CPC .............. H04W 36/144; H04W 88/18; H04W 36/0038; H04W 36/0044; H04W 36/00; H04W 36/14; H04W 36/305; H04W 36/362; H04W 28/0226; H04W 28/08; H04W 80/00; H04W 80/12; H04W 76/00; H04W 76/10; H04W 76/11; H04W 76/22; H04W 88/00; H04W 88/02; H04W 88/08; H04W 48/18; H04W 16/28; H04W 12/037; H04W 12/033; H04W 12/08; H04W 28/00; H04W 28/02; H04W 36/0005; H04W 36/0064; H04W 36/0066; H04W 36/34; H04W 36/36; H01Q 3/30; H01Q 15/0086; H01Q 15/16; H01Q 15/00; H01Q 1/288; H01Q 1/28; H01Q 1/24; H04B 7/06952; H04B 7/06; H04B 17/382; G05B 2219/31165; H04L 41/046; H04L 41/342; H04L 43/20; H04L 43/0888; H04L 43/0852; H04L 43/0823
See application file for complete search history.

(56) References Cited

U.S. PATENT DOCUMENTS

| | | |
|---|---|---|
| 2019/0104458 A1* | 4/2019 | Svennebring et al. ........................ H04W 36/30 |
| 2020/0008072 A1* | 1/2020 | Cui et al. .............. H04W 16/14 |
| 2020/0067831 A1 | 2/2020 | Spraggins et al. |
| 2020/0195557 A1 | 6/2020 | Duan et al. |
| 2021/0084562 A1* | 3/2021 | Maria ................... H04W 40/12 |
| 2021/0258069 A1* | 8/2021 | Sazegar et al. .... H04B 7/18515 |
| 2022/0116854 A1* | 4/2022 | Vidyashankar et al. ........................ H04W 48/08 |
| 2022/0124850 A1* | 4/2022 | Gundavelli et al. .. H04W 76/15 |
| 2022/0141718 A1* | 5/2022 | Shekhar et al. .. H04W 36/0022 |
| 2022/0330112 A1* | 10/2022 | Kumar Patra et al. ........................ H04W 36/00837 |

OTHER PUBLICATIONS

Gong et al. (CN 107147507 A) >>> Control Plane Framework Of Software Defined Network And Control Method (see title) (Year: 2017).*
Chai et al. (CN 108134675 B) >>> Control Based On SDN Network, Data Plane Device And Authentication Method And System Thereof (see title) (Year: 2018).*
International Search Report and Written Opinion on the Patentability of Application No. PCT/US2022/031488 Mailed Sep. 15, 2022, 9 pages.
International Preliminary Report on Patentability received for PCT Patent Application No. PCT/US2022/31488, mailed on Dec. 7, 2023, 6 pages.

* cited by examiner

CONTROL OF CONNECTIVITY BETWEEN A SATELLITE AND A WIDE AREA NETWORK USING A COMMON CONTROL PLANE

RELATED APPLICATION

The present application is a non-provisional application of and claims the benefit of U.S. Provisional Patent Application No. 63/194,463 filed May 28, 2021 and entitled "L-band/S-band Common Control Plane", which is incorporated by reference in its entirety.

FIELD OF THE INVENTION

Embodiments disclosed herein are related to wireless communication systems; more particularly, embodiments disclosed herein are related to control of connectivity between a remote unit (e.g., a satellite terminal) and one or more wide area networks (WANs) using a common control plane.

BACKGROUND

Networks are often described in terms of their control and data planes. The control plane of a network carries information to establish and control the network, including controlling how data packets are forwarded between network interfaces. In many conventional networks, control planes are implemented with a router.

A WAN is a large network that facilitates communication between devices that are remotely-located with respect to each other using a WAN provider, One type of WAN is referred to as a software-defined wide area network (SD-WAN), which is a network that is abstracted from its hardware. In software-defined networking (SDN), the control and data planes are separate, such that the control plane management of network devices is separated from the underlying data plane that forwards network traffic. In such a case, both planes can be managed using software.

SUMMARY

A wide area network (WAN) communication framework having a common control plane and method for using the same are disclosed. In some embodiments, the wide area network (WAN) communication framework comprises: a plurality of management systems, each for controlling access to and traffic for one of a plurality of WANs that include satellite and terrestrial communication networks; a remote unit capable of communicably coupling to the plurality of WANs; and a master network management system (MNMS). The MNMS is communicably coupled to the plurality of management systems and coupled to the remote unit to aggregate control information from the plurality of management systems and the remote unit to determine which WANs of the plurality of WANs for the remote unit to use, wherein the MNMS uses a common control plane communicably coupled to the remote unit for control and routing of control traffic, including information indicating which WANs of the plurality of WANs to which the remote terminal can connect, the common control plane including a single, continuous control channel to which the remote terminal is connectable simultaneously with a connection to a WAN of the plurality of WANs.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments describe herein include the use of a control plane in a wide-area network (WAN) network framework. In some embodiments, the control plane is a common control place used by a remote communications terminal in the WAN framework for exchanging information related to the network architecture, routing and control within the WAN network framework. In some embodiments, the remote communications terminal is a user terminal consisting of a satellite terminal with a satellite antenna and terrestrial user equipment like a cellular modem and antennas. Examples of a satellite antenna that can be part of the satellite terminal are provided below.

In some embodiments, the control plane comprises a continuous, positive control channel for a remote communications terminal and its corresponding networks (e.g., public networks, private networks, the Internet, etc.) within the WAN framework. In some embodiments, the control channel is continuous in that it's always available. With the positive control channel established, the control channel can be used for obtaining information to determine WAN(s) for use by the remote communications terminal to enable the remote communications terminal to be configured for its operational demands with link switching associated with WAN handovers occurring without operator intervention or service disruption.

In some embodiments, the common control plane is the function of the network that carries the traffic required for network architecture, routing and control. In some embodiments, the control plane also carries information indicating control and awareness of all potential WANs to which the remote communications terminal can connect. In some embodiments, the common control plane carries information, awareness, and potentially control of the remote communications terminal through to the network hubs and gateways so that end to end control of the network is maintained with the common control plane.

Figure 1:
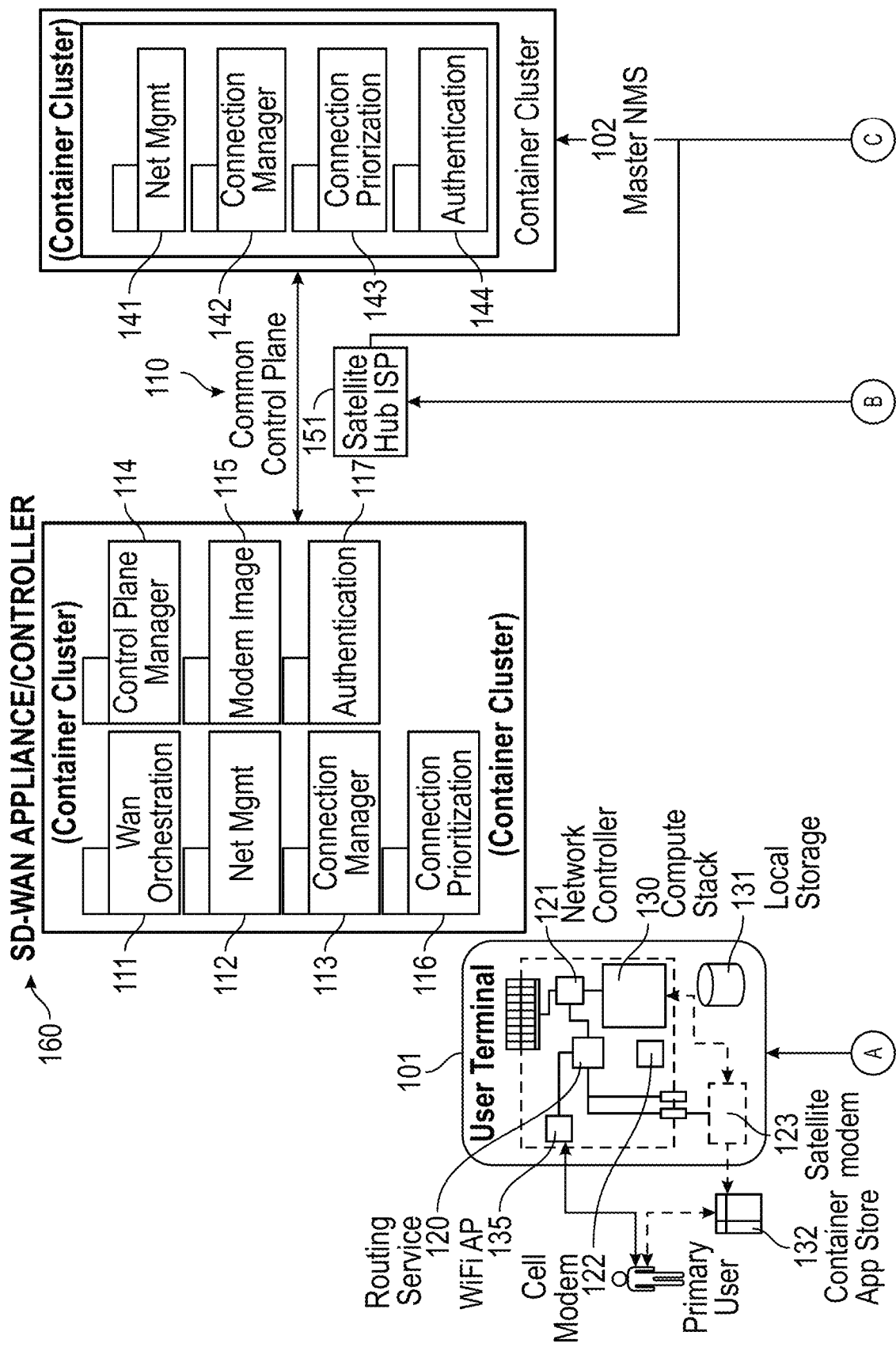
FIG. 1 illustrates a wide area network (WAN) communication framework.
Figure 1:
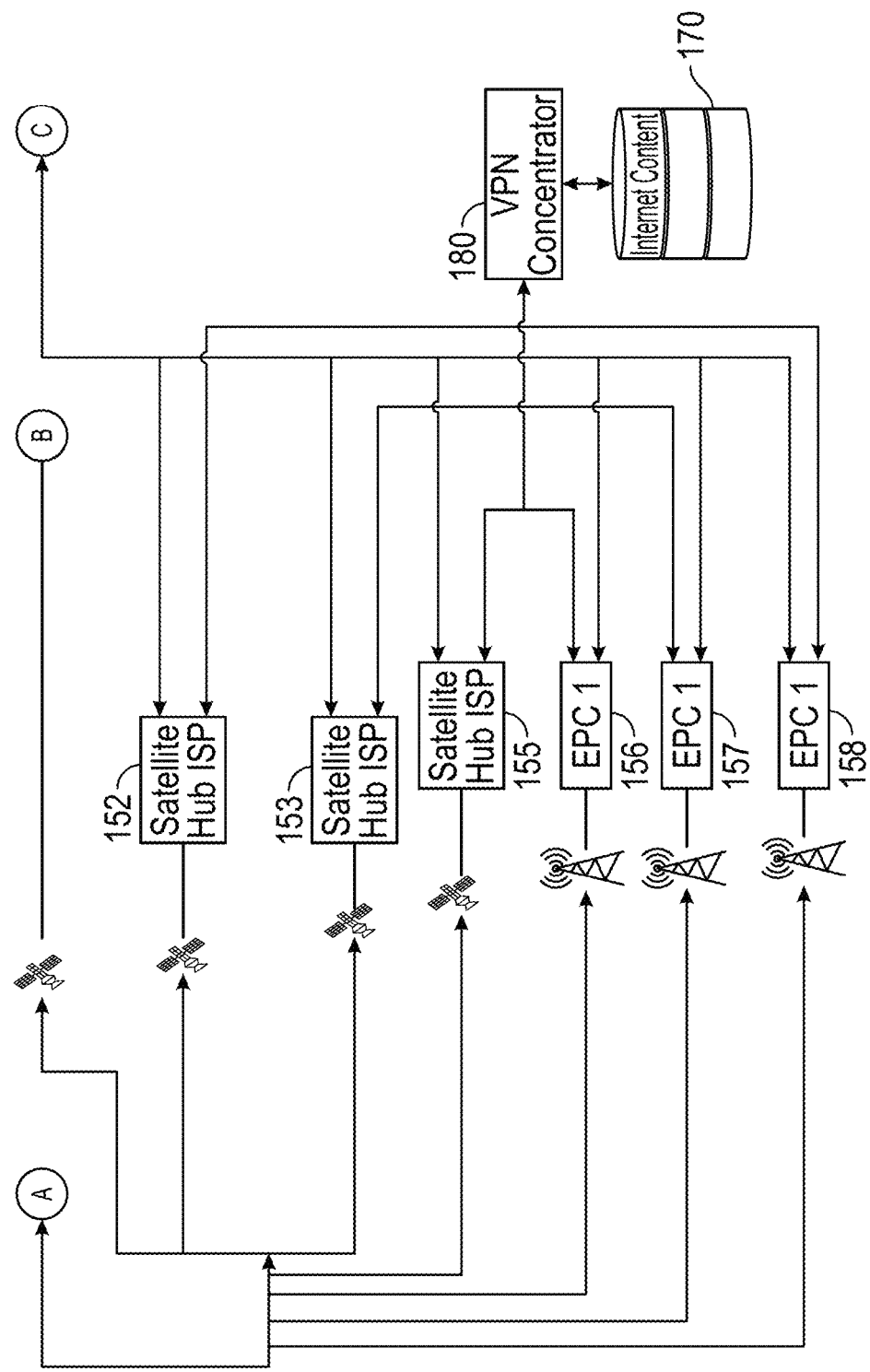

FIG. 1 illustrates a wide area network (WAN) communication framework. Referring to FIG. 1, the WAN communication framework includes multiple management systems, where each of the management systems controls access to and traffic for one of multiple WANs within the WAN framework. The WANs may include one or more satellite communication networks and one or more terrestrial communication networks.

The WAN communication framework of FIG. 1 also includes a remote communications terminal referred to as user terminal 101. User terminal 101 is capable of connecting, or otherwise communicably coupling, to the satellite and terrestrial communication networks in the WAN framework. More specifically, user terminal 101 can communicably couple via a satellite connection to satellite network management systems of satellite WANs, referred to as hubs, such as, for example, satellite hub Internet Service Providers (ISPs) 151-154. Also, user terminal 101 can communicably couple via cellular connections to cellular network management systems of cellular WANs, referred to evolved packet core (EPC) or virtual evolved packet core (vEPC) in the case of LTE networks, such as, for example, EPCs 156-158. Note that the techniques disclosed herein are not limited to WAN frameworks having four satellite networks and three cellular networks as shown in FIG. 1; more or less of these networks may be included in the WAN framework.

In some embodiments, the satellite and cellular network management systems (e.g., satellite hub ISP 151-154, EPCs 156-158, etc.) are also communicably coupled to virtual private network (VPN) concentrator 180 that provides access to Internet content 170. In some embodiments, VPN concentrator 180 acts to aggregate the links from satellite hub ISP 151-154, EPCs 156-158 into one place. By performing this aggregation, VPN concentrator 180 can present a single Internet Protocol (IP) address to Internet content 170 even though the communications from user terminal 101 may be through any one of the satellite and cellular network management systems (e.g., satellite hub ISP 151-154, EPCs 156-158, etc.).

The WAN communication framework of FIG. 1 also comprises a master network management system (MNMS) 102 that is also communicably coupled, via a wired or wireless connection (communication link), to satellite hub ISPs 151-154 and EPCs 156-158. In some embodiments, MNMS 102 is coupled to user terminal 201 and one or more of satellite network management systems (e.g., hub ISPs 151-154) and/or one or more cellular network management systems (e.g., EPCs 156-158) via control plane 110.

In some embodiments, MNMS 102 is an aggregator of various network management services for individual networks in the WAN framework. In other words, while each satellite and cellular WAN has its own form of network management system (e.g., satellite hub ISP 151-154, EPCs 156-158, etc.) to control traffic on the network, authorize users on the network, control network contention, control physical parameters of the network services, etc., MNMS 102 acts as an aggregation point of control for all management systems so that a common point of control of the network can be realized. That is, MNMS 102 aggregates control for all management systems (e.g., satellite hub ISP 151-154, EPCs 156-158, etc.) and is aware of all networks available in the WAN framework to which user terminal 101 is able to connect. In this way, a single system can be aware of the network capabilities of all WANs available and can place service requests and information requests from the operator networks. To that end, MNMS 102 individually interacts with the NMS and EPCs for the available networks via API, VPN, or other integration method.

Control plane 110 exists between user terminal 101 and MNMS 102. In some embodiments, within control plane 110 exists as a single continuous control channel. In some embodiments, the single control channel is used as a continuously available WAN between user terminal 101 and MNMS 102, particularly where no more optimal channel exists at the time. The control channel is an active physical pathway currently in use to provide the control plane information. In some embodiments, the single control channel comprises a narrow band (but resilient) connection such as, for example, an L-band or S-band satellite connection.

In some embodiments, given that diverse WAN links provide redundant connectivity between user terminal 101 and virtual traffic concentrator 180, the control channel of control plane 110 may exist on any one of the WAN links at a given time, determined by logic within the SD-WAN appliance in the terminal and the virtual WAN orchestration service in the virtual operational stack. The control channel, therefore, may exist on any WAN link to virtual concentrator 180, through to MNMS 102.

Leveraging the multi-WAN solution, in some embodiments, the control channel is selected using a similar process in which data traffic is routed over a software-defined WAN (SD-WAN). For example, given a set of parameters, the active control channel is selected from among all active WAN connections. In some embodiments, these parameters are dynamic and automated and include decisions such as, for example, but not limited to, link availability, user data traffic demands on the network, reliability, etc.

In some embodiments, MNMS 102 uses common control plane 110 to carry information for control and routing of traffic between MNMS 102 and user terminal 101. In some embodiments, common control plane 110 orchestrates WAN connections. As part of orchestration, the information that is carried on common control plane 110 enables MNMS 102 to determine the optimal WAN connection(s) to configure for the demands so that the link switching for the WAN handovers occurs without operating or intervention and service disruption. In some embodiments, this information includes information that indicates potential WANs from the WANs in the framework to which user terminal 101 can connect. In some embodiments, MNMS 102 receives metrics and other parameters of any unused but available communication links of the WANs in the framework and directs user terminal 101 to switch to a new connection (e.g., switch to a new WAN for communication).

In some embodiments, MNMS 102 includes a network management service 141, a connection manager service 142, a connection prioritization service 143 and an authentication service 144. In some embodiments, these are part of a container cluster within MNMS 102. In some embodiments, network management service 141 manages the network and enables the user terminal 101 to connect to one or more WANs in the network.

In some embodiments, connection manager service 142 operates as a connection manager to oversee the connections between user terminal 101 and the WANs in the framework. In some embodiments, connection manager service 142 polls and interrogates all available hub and gateway platforms to understand availability metrics. In some embodiments, these metrics include, but are not limited to, downlink power, contention of the beam of interest, potential throughput of the data link, reliability and/or latency. In some embodiments, using this information, connection manager service 142 creates a real-time budget calculation by combining this information with information related to user terminal 101. The information related to user terminal 101 can include the current position of user terminal 101, its motion profile and its attitude. In some embodiments, connection manager service 142 maintains a list of available transport links to which the user terminal 101 can connect.

In some embodiments, connection prioritization service 143 prioritizes the connections that are available to user terminal 101 based on the information received from the management systems for the WANs (e.g., satellite hub ISPs 151-154, EPCs 156-158, etc.). In some embodiments, connection prioritization service 143 stores and holds a prioritized list of preferred WAN connections. In some embodiments, the prioritization is based on one or more of environment, location, status, reliability, quality, and/or latency. In some embodiments, the prioritized list is based on traffic demand and type, motion profile of the remote communication terminal (e.g., user terminal 101), and/or the number of operators connected to the WAN framework.

Authentication service 144 performs pre-authentication to determine whether user terminal 101 is authorized to connect with the available WAN connections. In some embodiments, authorization service 144 performs pre-authorization on the connections indicated by connection prioritization service 143 as part of a prioritized list of connections available to user terminal 101.

In some embodiments, user terminal 101 includes a number of services to facilitate performing communications. In some embodiments, these services include a routing service 120 that controls the routing for user terminal 101, including the routing of data and information using satellite communications and cellular communication. Routing service 120 is coupled to a network controller 121 that controls network access and connects multiple connections to user terminal 101 via the satellite connections and/or cellular connections. In some embodiments, routing service 120 is also coupled to a cellular modem 122 that provides access to cellular networks such as, for example, those associated with EPCs 156-158. In some embodiments, user terminal 101 incudes a compute stack 130 performing computing operations. In some embodiments, compute stack 130 includes one or more processors that execute code to perform functions associated with user terminal 101. The code can be part of a container or container cluster (e.g., a container cluster for a SD-WAN appliance/controller, etc.). In some embodiments, routing service 120 is also coupled to satellite modem 123 or a type of software-defined modem.

User terminal 101 also includes local storage 131 that may store one or more containers. These containers may include applications from container application store 132 and are accessed by a user (e.g., primary user of user terminal 101). A user may have access to user terminal 101 via a WiFi AP application 135, which is coupled to routing service 120.

In one embodiment, the user terminal includes an SD-WAN appliance/controller 160. In some embodiments, SD-WAN controller/appliance 160 routes traffic over one or more links that are communicably connected to satellite and/or terrestrial communication networks, including common control plane 110. In some embodiments, prior to a handover to a new connection and routing traffic over the new connection, SD-WAN controller 160 utilizes control plane 110 to maintain sessions and authentications associated with the first WAN connection while performing the handover to a second WAN connection. In some embodiments, this occurs in situations where user terminal 101 is able to have only one connection at a time. For example, if user terminal 101 is switching between two satellite connections and is able to have only one satellite connection at a time, to avoid disrupting service, user terminal 101 may route session and authentication information over control plane 110 when terminating service over one connection and establishing connectivity over the second satellite connection.

In some embodiments, SD-WAN controller 160 is implemented, at least in part with a container cluster. Code in the container cluster can be executed using compute stack 130. In some embodiments, the SD-WAN controller 160 comprises WAN orchestration service 111, network management service 112, connection manager service 113, control plane manager service 114, modem image 115, connection prioritization service 116 and authentication service 117. In some embodiments, WAN orchestration service 111 orchestrates communication links for use by user terminal 101. In some embodiments, network management service 112 manages the overall network connectivity for user terminal 101. In some embodiments, connection manager service 113 manages individual connections for user terminal 101. In some embodiments, control plane manager 114 manages communication with control plane 110. In some embodiments, modem image 115 is a set of parameters for programming a SD modem (e.g., modem 123). In some embodiments, connection prioritization service 116 prioritizes connections based on the available connections for user terminal 101. In some embodiments, the available connections for user terminal 101 are provided by NMNS 102 via control plane 110. In some embodiments, authentication service 117 performs an authentication with respect to available connections for user terminal 101 to determine if user terminal 101 is authorized to connect to a particular WAN in the framework.

WAN Orchestration Logic Over the Control Plane

One use of common control plane 110 is to facilitate the orchestration of WAN connections. In some embodiments, there are generally two components to the orchestration of WAN connections, the first being the establishment of the physical and network connections between the remote unit (e.g., user terminal 101) and the hub or gateway (e.g., satellite hub ISP 151-154, EPCs 156-158, etc.) and the second is the movement of traffic across the physical network between the user terminal 101 (remote communications unit) and the Internet or other public and/or private network accessible via a hub or gateway.

In some embodiments, user terminal 101 has the ability to connect to multiple different terrestrial (e.g., LTE, 5G) and non-terrestrial (e.g., LEO, MEO, or GEO SATCOM) networks. However, in designs of the terminal that are based on low cost and efficiency, elements such as multi-band apertures, a common RF chain, and software-defined modems are utilized to connect to the diverse networks without the use of redundant components. This generally means that only one of any type of terrestrial and one of any type of non-terrestrial network can be utilized at a given time. In some embodiments, the single continuous control channel (e.g., narrow band satellite connection) described above functions as a third link that can be connected simultaneously. In some embodiments, this link is connected to and can be utilized to communicate with the various hubs and gateways (e.g., satellite hub ISP 151-154, EPCs 156-158, etc.) to determine the parameters and metrics of any unused but available communications links in order to gather information about the connection prior to directing the remote terminal to switch to a new connection type. Also, in some embodiments, common control plane 110 is used to maintain session and authentication during the handover while the user terminal 101 switches between connections to two WANs where the remote unit can connect to only one of the WANs at a time.

Figure 2:
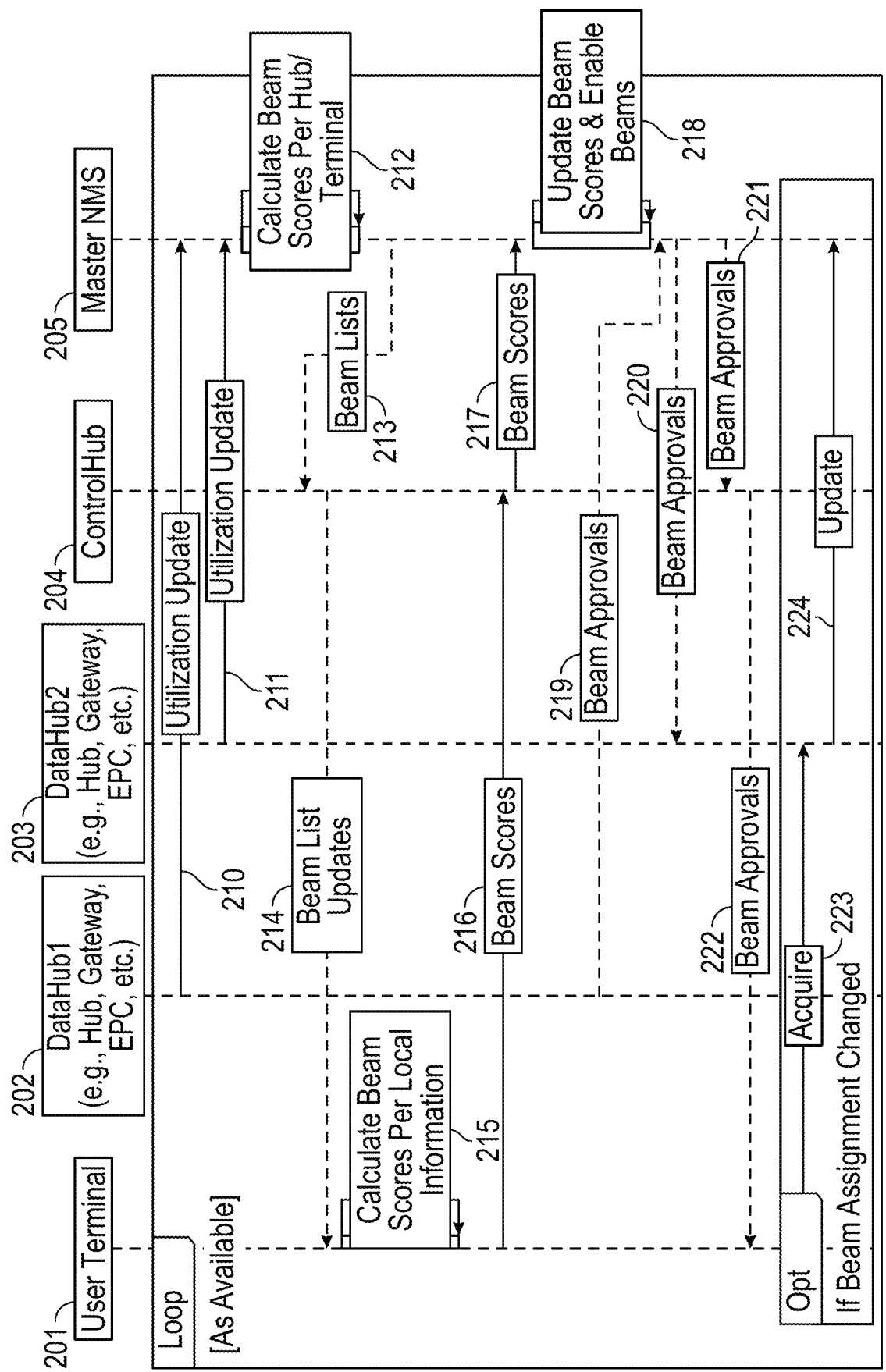
FIG. 2 is a data flow diagram of some embodiments of a process for performing WAN orchestration over the common control plane.

FIG. 2 is a data flow diagram of some embodiments of a process for performing WAN orchestration over the common control plane. In some embodiments, the process is performed by WAN orchestration logic of a master NMS 205 (e.g., MNMS 102). Referring to FIG. 2, data hubs 202 and 203 send utilization update information (210, 211) to the MNMS 205. In some embodiments, data hubs 202 and 203 comprise hubs, gateways, EPCs, or other management system that controls access and data traffic over a WAN, and the utilization update information (210, 211) includes information specifying availability of the WAN and metrics and characteristics of the WAN upon which a determination can be made as to whether the remote terminal should use that WAN. These characteristics include one or more of downlink power, contention on the beam of interest, potential throughput of the datalink, potential latency of the datalink, reliability, and potentially other metrics.

In response to utilization update information, MNMS 205 calculates beam scores for the remote units (e.g., user terminal 101, 201) (and other remote units in the WAN framework) per hub (212). Based on the calculated beam scores, MNMS 205 sends a beam list (213) to a control hub 204, which sends the beam list as an update (214) to user terminal 201 to update the list held by user terminal 201 of available connections.

In response to the beam list update (214), user terminal 201 calculates beam scores per its local information (215). In some embodiments, this local information includes the current position, motion profile, and attitude of user terminal 201. User terminal 201 sends the calculated beam scores (216) to control hub 204 which forwards them (217) to MNMS 205. In response to the beam scores from control hub 204, MNMS 205 updates the beam scores and enables beams (218) that are available to user terminal 201.

MNMS 205 sends beam approvals to data hub 202 (219), data hub 203 (220) and control hub 204 (221). In some embodiments, the beam approvals are based on potential connections, network quality, reliability, or sensed information indicating the user's connection will be more conducive to one or more of the available physical networks. In response to beam approval (221), control hub 204 sends the beam approval (222) onto user terminal 201. At this stage, with the approved list of beams, user terminal 201 is able to acquire a connection to one of the data hubs, such as, for example, data hub 203 (223) if the beam assignment has changed. In this case, user terminal 201 acquires a satellite signal to create a connection to data hub 203, and thereafter data hub 203 sends the update to MNMS (224) indicating that user terminal 201 is in communication with the WAN associated with data hub 203.

Figure 3:
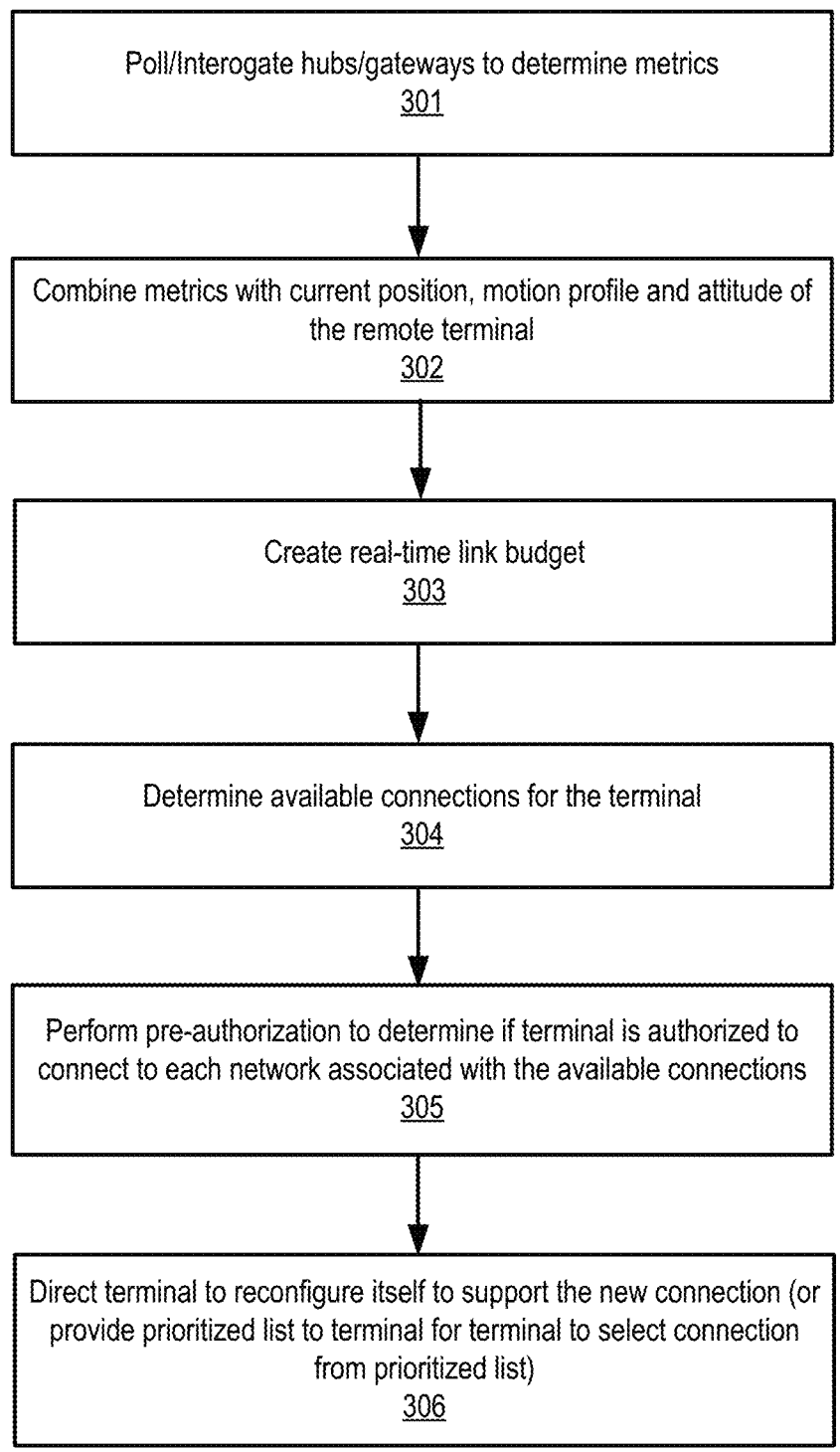
FIG. 3 is a flow diagram of some embodiments of a process for performing link orchestration.

FIG. 3 is a flow diagram of some embodiments of a process for performing link orchestration. The process is performed by processing logic that comprises hardware (e.g., circuitry, dedicated logic, etc.), software (e.g., software running on a chip(s) or processor(s), etc.), firmware, or a combination of the three. In some embodiments, the processing logic is part of a master MNS.

Referring to FIG. 3, the process begins by polling and interrogating hubs and gateways associated with the WAN connections (processing block 301). The polling and interrogating results in the gathering of information regarding the links that may be available for use by the remote communications unit (e.g., user terminal 101). Next, processing logic combines metrics with the current position, motion profile, and attitude of the remote terminal (processing block 302). In some embodiments, this information is transferred to the MNMS from the remote communications unit. Using the combination of the metrics with the remote terminal characteristics, processing logic creates a real-time link budget (processing block 303). Based upon the link budget, processing logic determines the available connections for the terminal (processing block 304). In some embodiments, these operations are performed by a connection manager microservice running on the MNMS.

Using the available connections, processing logic performs pre-authorization to determine if the remote terminal is authorized to connect to each network associated with the available connections (processing block 305). In some embodiments, this operation performed by an authentication microservice running on the MNMS or both the MNMS and the SD-WAN controller of the remote terminal. Based on this analysis, processing logic directs the remote terminal to reconfigure itself to support the new connection (or provides a prioritized list to the terminal for the terminal to select the connection from the prioritized list to connect to) (processing block 306).

Figure 4:
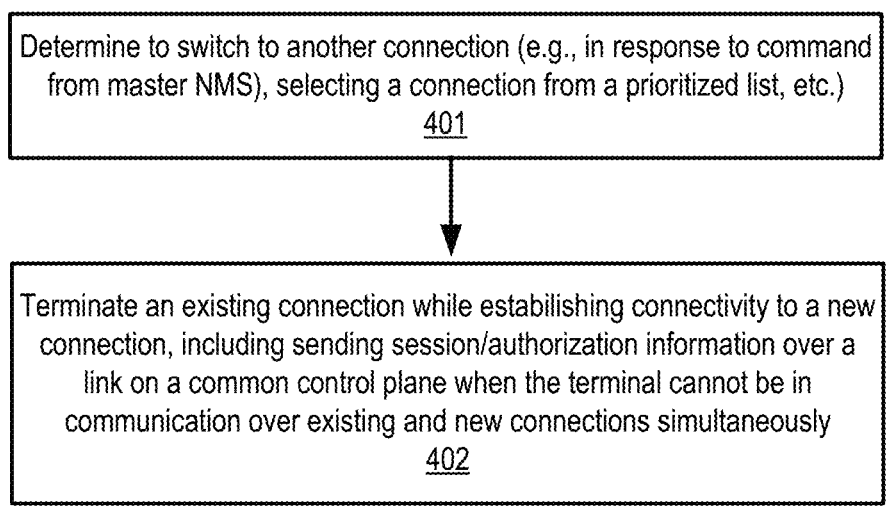
FIG. 4 is a flow diagram of some embodiments of a process to change connections performed by a remote terminal.

FIG. 4 is a flow diagram of some embodiments of a process to change connections performed by a remote terminal. The process is performed by processing logic that comprises hardware (e.g., circuitry, dedicated logic, etc.), software (e.g., software running on a chip(s) or processor(s), etc.), firmware, or a combination of the three. In some embodiments, the processing logic is part of an antenna for satellite communication such as, for example, an antenna that is part of a satellite terminal (e.g., user terminal 101).

Referring to FIG. 4, the process begins by determining to switch to another connection (processing block 401). In some embodiments, this determination is made in response to a command from a MNMS. In some other embodiments, the remote terminal determines to switch to another connection based on a prioritized list of connections received from the MNMS. In some embodiments, the list of prioritized connections includes only connections to which the remote terminal is pre-authorized to connect or determines it has authorization to make the connection.

After determining to switch to another connection, processing logic terminates an existing connection while establishing connectivity to a new connection (processing block 402). In some embodiments, terminating the existing connection while establishing connectivity to a new connection includes sending session and/or authorization information over another link on a common control plane in situations where the terminal cannot be in communication over the existing and new connections simultaneously. In some embodiments, this link is the single continuous control channel (e.g., narrow band (e.g., L-band, S-band) satellite connection) that is part of the common control plane (e.g., control plane 110).

The processes using the common control plane described above may be illustrated using an example of this is as follows. In this example, a remote terminal is connected and has an active WAN connection through a Ku-band commercial geostationary satellite interface. The SD-WAN controller of the remote terminal has determined that its current connection to a WAN is the optimal network for route its data traffic, and thus this connection is considered as its primary transport link. Concurrently, a connection established between the connection manager microservice running on the remote terminal and the MNMS using the L-band connection (the single continuous control channel) is used for communicating with the MNMS element. The MNMS is communicating with the hub for both the active Ku-band geostationary satellite interface and a different vendor LEO satellite system using a logic process and determines that the LEO connection is now available to the remote terminal and that this represents a much higher performance connection. In response to this determination, the MNMS then directs the remote terminal to reconfigure itself to support the different frequency, the different waveform, and the different tracking algorithm needed for the connection to the LEO satellite system. Soon thereafter, the remote terminal terminates service on the geostationary satellite, reconfigures itself for the LEO connection, and establishes connectivity through the LEO platform.

In the example above, in some embodiments, there are three distinct sequences that occur. The first sequence is obtaining the necessary intelligence to make the decision to change WAN connections. In some embodiments, a collection of microservices, referred to herein as the connection manager service, of the master NMS performs the functions of continually polling and interrogating all available or pre-set hub/gateway platforms to understand key availability metrics, such as, for example, but not limited to, downlink power, contention on the beam of interest, potential throughput of the datalink, potential latency of the datalink, and other metrics. In some embodiments, these parameters are combined with the current position, motion profile, and attitude of the remote terminal and, in effect, a real-time link budget calculation is created. The combination can be done by the master NMS or can be done by the remote terminal with information from the master NMS. In some embodiments, this collection and/or combination of information occurs simultaneously and continuously for any and all available data links. In this way, the connection manager service maintain a list (e.g., a hierarchical list) of the transport links available for use by the remote terminal.

The second action that occurs in some embodiments is that a connection prioritization service holds a dynamic, static, or intelligent prioritized list of preferred connections. In some embodiments, this list can be dynamic and based on environment, location, status of the user terminal (e.g., mission status), or other discrete inputs. In some other embodiments, the list can be statically programmed by operators. In some other embodiments, the list can be created and made available using an intelligent controller than can interpret elements such as, for example, but not limited to, traffic demand and type, motion profile, number of operators connected to the platform, and other factors and will build a profile (e.g., a mission profile). Based on this profile, the intelligent controller can make the prioritized decision regarding which data link of the available data links is preferred for use by the remote terminal.

Finally, in some embodiments, the third action that occurs is an authentication microservice that exists in the remote terminal uses the active control channel to communicate with a corresponding service in the MNMS. This microservice identifies the available connections and performs a pre-authorization (before connection) to ensure that the remote terminal has the authority to connect to the network. If so, a modem image service checks to ensure that the local image (e.g., programming) for the SD-modem is accurate. If any options files or versions need to be changed, this service can request and push a new image to hold in the local database on the remote terminal. This is put in place so that when the new connection is made and service is requested, the authentication and network setup is a much faster process.

In some embodiments, the three actions described above result in a prioritized listing of connections that are preferred based on performance ($1^{st}$ action), operational needs ($2^{nd}$ action), and can be pre authenticated ($3^{rd}$ action). In this way, the connection at the highest priority will be used with the second priority connection ready as the secondary connection.

Once the decision has been made to switch to a different transport connection, it will greatly improve operator experience if all data sessions, authentications, and other active network elements can be maintained. In some embodiments, the nature of the handover is effectively a break-before-make handover, and thus there will be an interruption in the primary transport link as the remote terminal physically reconfigures to connect to the next network. Primarily, the SD-WAN service routes all traffic over another already established WAN connection prior to the handover so that all sessions and authentications can be preserved. In some embodiments, a discrete input is used to command the SD-WAN controller to route traffic over the secondary link prior to switching the primary link to a different service. However, in the case of only a single available WAN connection, all sessions and authentications can be moved over to the single control channel (e.g., the narrow band (L-band, S-band) connection usually reserved for the control channel of the common control plane. In some embodiments, logic suppresses user data traffic and allows only the traffic required for maintaining sessions and authentications. Once the handover is complete, the SD-WAN controller takes over and moves all sessions over to the new primary WAN connection. Once this has occurred, user traffic resumes. In this way, the user sees a slight pause in service, but as sessions are not disconnected, tunnels are not closed, and any authentications is maintained, there is little overall network disconnection.

Therefore, embodiments disclosed herein provide for intelligence that determines the wide-area network(s) to configure based on operational demands so that WAN handovers and link switching all occur without operator intervention or service disruption. Such embodiments are advantageous in that existing satellite communications systems require a hard handover from one control plane, meaning a break in the service, attempted acquisition, and then possible reacquisition back into the previous network, which means that a user is unable to pass data during this time. Embodiments described herein avoid these limitations.

There are alternatives to the embodiments described above. First, in some embodiments, a master NMS may be integrated at single hub. Second, in some embodiments, scoring computations and final handover decisions are hosted on the edge compute device or the master NMS.

Figure 5:
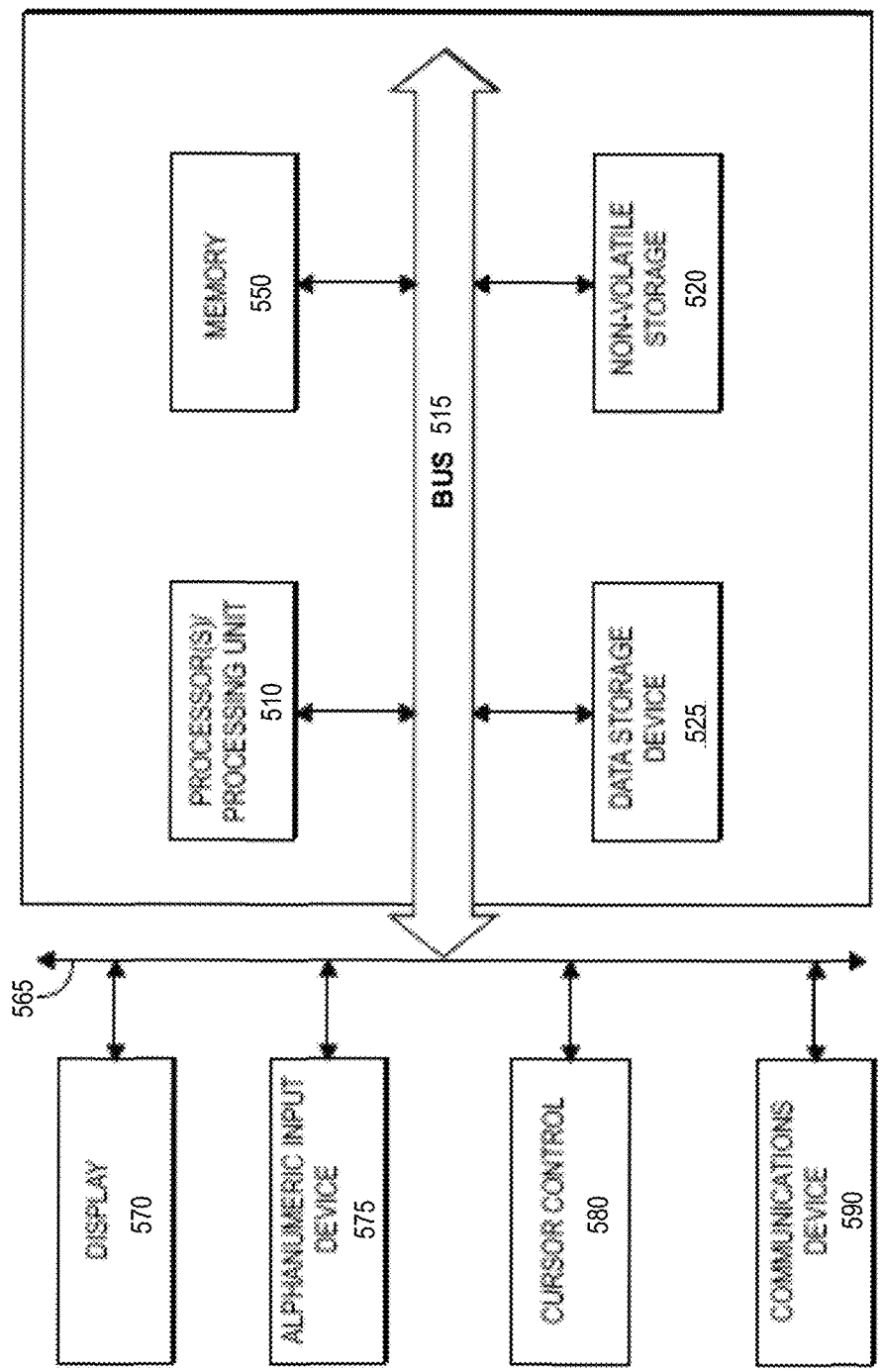
FIG. 5 illustrates some embodiments of a computing device that may be part of the user terminal

FIG. 5 is one embodiment of a computing device that may be part of the user terminal to support the operations discussed herein, including the compute stack. It will be apparent to those of ordinary skill in the art, however, that other alternative computing devices of various system architectures may also be used.

The computing device 500 illustrated in FIG. 5 includes a bus or other internal communication means 515 for communicating information, and one or more processors 510 coupled to the bus 515 for processing information. The computing device further comprises a random-access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor(s) 510. The computing device also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

Another device, which may optionally be coupled to computing device 500, is a communication device 590 for accessing other nodes of a distributed system via a network (e.g., a WAN network). The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computing device 500 and the outside world. Note that any or all of the components of this system illustrated in FIG. 5 and associated hardware may be used in various embodiments as discussed herein.

In some embodiments, processor(s) 510 executes instructions to perform any of the operations described above including, but not limited to, the services described above with respect to the user terminal, including the container cluster of the user terminal.

It will be appreciated by those of ordinary skill in the art that any configuration of the computing device may be used for various purposes according to the particular implementation. The control logic or software implementing the described embodiments can be stored in main memory 550, mass storage device 525, or other storage medium locally or remotely accessible to processor 510.

In some embodiments, the computing device may further be coupled to a display device 570, such as a light emitting diode (LED) display or a liquid crystal display (LCD) coupled to bus 515 through bus 565 for displaying information to a user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

It will be apparent to those of ordinary skill in the art that the computing, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms that permit the user to communicate in a basic manner with the device. In general, the more special-purpose the device is, the fewer of the elements need to be present for the device to function.

Examples of Antenna Embodiments

The techniques described above may be used with flat panel satellite antennas. Examples embodiments of such flat panel antennas are disclosed. In some embodiments, the remote terminal comprises an electronically scanned antenna. In some embodiments, the electronically scanned antenna comprises a flat-panel antenna having a metasurface with radio-frequency (RF) radiating antenna elements, a phased array antenna, or a gimballed, parabolic dish antenna. In some embodiments, the electronically scanned antenna is operable to produce and steer multiple beams.

In some embodiments, the flat panel antenna includes one or more arrays of antenna elements on an antenna aperture. In some embodiments, the antenna aperture is a metasurface antenna aperture, such as, for example, the antenna apertures described below. In some embodiments, the antenna elements comprise diodes and varactors such as, for example, described above and described in U.S. Patent Application Publication No. 20210050671, entitled "Metasurface Antennas Manufactured with Mass Transfer Technologies," published Feb. 18, 2021. In other embodiments, the antenna elements comprises LC-based antenna elements, such as, for example, those disclosed in U.S. Pat. No. 9,887,456, entitled "Dynamic polarization and coupling control from a steerable cylindrically fed holographic antenna", issued Feb. 6, 2018, or other RF radiating antenna elements. In some embodiments, the flat panel antenna is a cylindrically fed antenna that includes matrix drive circuitry to uniquely address and drive each of the antenna elements that are not placed in rows and columns. In some embodiments, the elements are placed in rings.

In some embodiments, the antenna aperture having the one or more arrays of antenna elements is comprised of multiple segments coupled together. When coupled together, the combination of the segments form closed concentric rings of antenna elements. In some embodiments, the concentric rings are concentric with respect to the antenna feed.

In some embodiments, the flat panel antenna is part of a metamaterial antenna system. Embodiments of a metamaterial antenna system for communications satellite earth stations are described. In some embodiments, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In some embodiments, the antenna system uses surface scattering metamaterial technology to form and steer transmit and receive beams through separate antennas.

In some embodiments, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 6:
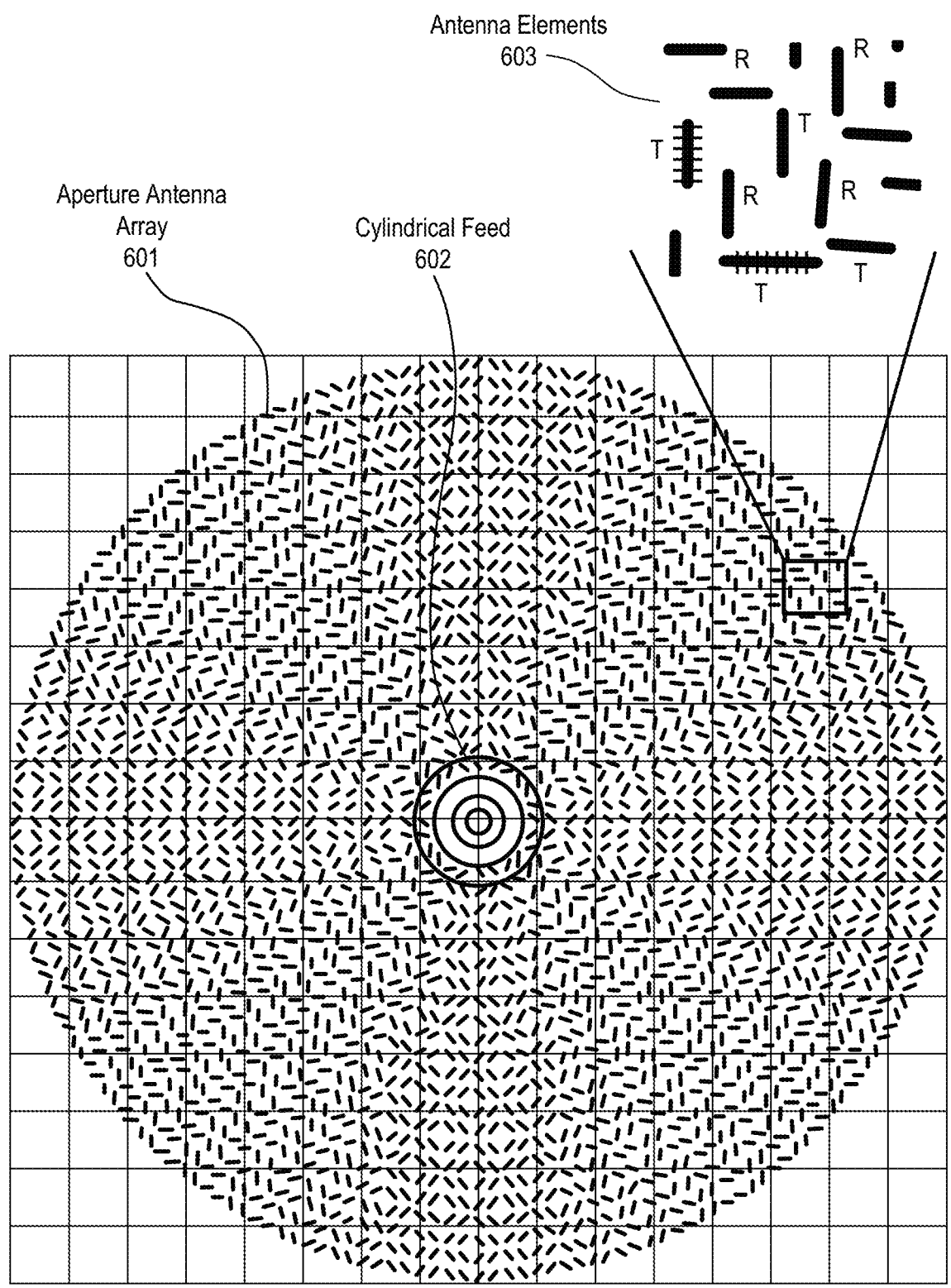
FIG. 6 illustrates the schematic of one embodiment of a cylindrically fed holographic radial aperture antenna.

FIG. 6 illustrates the schematic of one embodiment of a cylindrically fed holographic radial aperture antenna. Referring to FIG. 6, the antenna aperture has one or more arrays 601 of antenna elements 603 that are placed in concentric rings around an input feed 602 of the cylindrically fed antenna. In some embodiments, antenna elements 603 are radio frequency (RF) resonators that radiate RF energy. In some embodiments, antenna elements 603 comprise both Rx and Tx irises that are interleaved and distributed on the whole surface of the antenna aperture. Examples of such antenna elements are described in greater detail below. Note that the RF resonators described herein may be used in antennas that do not include a cylindrical feed.

In some embodiments, the antenna includes a coaxial feed that is used to provide a cylindrical wave feed via input feed 602. In some embodiments, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In some embodiments, antenna elements 603 comprise irises and the aperture antenna of FIG. 6 is used to generate a main beam shaped by using excitation from a cylindrical feed wave for radiating irises through tunable liquid crystal (LC) material. In some embodiments, the antenna can be excited to radiate a horizontally or vertically polarized electric field at desired scan angles.

In some embodiments, the antenna elements comprise a group of patch antennas. This group of patch antennas comprises an array of scattering metamaterial elements. In some embodiments, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In some embodiments, a liquid crystal (LC) is disposed in the gap around the scattering element. This LC is driven by the direct drive embodiments described above. In some embodiments, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in some embodiments, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In some embodiments, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In some embodiments, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In some embodiments, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In some other embodiments, antenna elements 603 comprise irises and diodes or varactors and the aperture antenna of FIG. 6 is used to generate a main beam shaped by using excitation from a cylindrical feed wave for radiating irises.

In some embodiments, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In some embodiments, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In some embodiments, the drive electronics for the antenna system comprise commercial off-the shelf LCD controls used in commercial television appliances that adjust the bias voltage for each scattering element by adjusting the amplitude or duty cycle of an AC bias signal to that element.

In some embodiments, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In some embodiments, multistate control is used in which various elements are turned on and off to varying levels, further approximating a sinusoidal control pattern, as opposed to a square wave (i.e., a sinusoid gray shade modulation pattern). In some embodiments, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In some embodiments, the antenna system produces one steerable beam for the uplink antenna and one steerable beam for the downlink antenna. In some embodiments, the antenna system uses metamaterial technology to receive beams and to decode signals from the satellite and to form transmit beams that are directed toward the satellite. In some embodiments, the antenna systems are analog systems, in contrast to antenna systems that employ digital signal processing to electrically form and steer beams (such as phased array antennas). In some embodiments, the antenna system is considered a "surface" antenna that is planar and relatively low profile, especially when compared to conventional satellite dish receivers.

There are a number of example embodiments described herein.

Example 1 is a wide area network (WAN) communication framework comprising: a plurality of management systems, each for controlling access to and traffic for one of a plurality of WANs that include satellite and terrestrial communication networks; a remote unit capable of communicably coupling to the plurality of WANs; and a master network management system (MNMS). The MNMS is communicably coupled to the plurality of management systems and coupled to the remote unit to aggregate control information from the plurality of management systems and the remote unit to determine which WANs of the plurality of WANs for the remote unit to use, wherein the MNMS uses a common control plane communicably coupled to the remote unit for control and routing of control traffic, including information indicating which WANs of the plurality of WANs to which the remote terminal can connect, the common control plane including a single, continuous control channel to which the remote terminal is connectable simultaneously with a connection to a WAN of the plurality of WANs.

Example 2 is the WAN communication framework of example 1 that may optionally include that the single control channel maintains a session and authentication during a handover while the remote unit switches connections between two WANs of the plurality of WANs when the remote unit can connect to only one of the two WANs at a time.

Example 3 is the WAN communication framework of example 1 that may optionally include that the MNMS uses the common control plane to orchestrate WAN connections for the remote unit by establishing physical and network connections between the remote unit and a hub or gateway of a WAN and moving traffic across between the remote and a network accessed by the hub or the gateway.

Example 4 is the WAN communication framework of example 1 that may optionally include that the common control plane comprises a single control channel.

Example 5 is the WAN communication framework of example 4 that may optionally include that the single control channel comprises a narrowband connection.

Example 6 is the WAN communication framework of example 4 that may optionally include that the narrowband connection comprises a L-band or S-band satellite connection.

Example 7 is the WAN communication framework of example 1 that may optionally include that wherein the single control channel is continuously available between the remote unit and the MNMS.

Example 8 is the WAN communication framework of example 1 that may optionally include that an SD-WAN controller of the remote unit routes traffic over a first link of a first WAN connection prior to a handover to a second link of a second WAN connection and routes traffic over a second link, if already established, when performing the handover, or if only a single WAN connection by the remote unit is available when performing the handover, then routing traffic over the single control channel to maintain any sessions and authentications of the first WAN connection, and thereafter having the SD-WAN controller move the sessions over to the WAN connection of the second link once established to resume transfer of user traffic of the sessions.

Example 9 is the WAN communication framework of example 1 that may optionally include that the remote terminal comprises electronically scanned antenna.

Example 10 is the WAN communication framework of example 1 that may optionally include that the electronically scanned antenna comprises a flat-panel antenna having a metasurface with a plurality of radio-frequency (RF) radiating antenna elements, a phased array antenna, or a gimballed, parabolic dish antenna.

Example 11 is a method comprising: communicating as part of a first session, by a remote unit, with a first WAN of a plurality of WANs using a first connection, the plurality of WANs including satellite and terrestrial communication networks; communicating concurrently, using a common control plane, with a master network management system (MNMS) that is in communication with hubs and gateways of the plurality of WANs; receiving, by the remote unit, a command to connect to a second WAN in the plurality of WANs from the MNMS over the common control plane in response to the MNMS determining availability of a second WAN of the plurality of WANs with characteristics indicating a second connection to the second WAN has a higher priority than the first connection; and terminating service with the first WAN and establishing connectivity with the second WAN, including communicating with the MNMS using a single control channel of the common control plane to maintain session and authentication information of the first session during a handover while the remote unit switches connections between the first and second WANs when the remote unit can have only one connection to the first and second WANs at a time.

Example 12 is the method of example 11 that may optionally include that the second connection is a next connection after the first connection on a prioritized list of available connections.

Example 13 is the method of example 11 that may optionally include determining, by the MNMS using one or more parameters and metrics, an alternative connection is available to the remote unit that is a better connection, and performing pre-authorization with respect to the alternative connection to verify the remote terminal is authorized to connect to the second WAN.

Example 14 is the method of example 13 that may optionally include that the one or more parameters and metrics are for two or more management systems that control access to two or more WANs.

Example 15 is the method of example 13 that may optionally include interrogating, by the MNMS, two or more of a plurality of management systems, each for controlling access to and traffic for one of the plurality of WANs, to obtain information regarding the one or more parameters and metrics.

Example 16 is the method of example 13 that may optionally include that the one or more parameters and metrics include one or more of downlink power, contention on the beam of interest, potential throughput of a data link, reliability, and latency.

Example 17 is the method of example 16 that may optionally include combining the one or more parameters and metrics with current position, motion profile, and attitude of the remote unit to create a real-time link budget for a plurality of data links.

Example 18 is the method of example 11 that may optionally include that the first connection is a satellite connection to a first satellite, and further wherein the command directs the remote unit to reconfigure itself to support a different frequency, a different waveform and a different tracking algorithm to support connection to a second satellite different than the first satellite.

Example 19 is the method of example 11 that may optionally include that the single channel comprises a narrow band connection.

Example 20 is the method of example 19 that may optionally include that the narrowband connection comprises a L-band or S-band satellite connection.

Example 21 is the method of example 11 that may optionally include that the remote unit is a satellite terminal.

Example 22 is a communications terminal comprising: an antenna aperture; and a SD-WAN controller having a control plane manager service to manage a common control plane comprising a continuous control channel for exchanging control information with a master NMS to select wide-area networks (WANs) for use during WAN handovers without operator intervention or service disruption involved.

Example 23 is the terminal of example 22 that may optionally include a WAN orchestration service for orchestration of WAN connections, wherein WAN orchestration service establishes physical and network connections to a hub or gateway associated with one of the WANs and controls movement of traffic across a physical network between the communications terminal and the one WAN associated with the hub or gateway.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A wide area network (WAN) communication framework comprising:
   a plurality of management systems, each for controlling access to and traffic for one of a plurality of WANs that include satellite and terrestrial communication networks;
   a remote unit capable of communicably coupling to the plurality of WANs; and
   a master network management system (MNMS) communicably coupled to the plurality of management systems and coupled to the remote unit to aggregate control information from the plurality of management systems and the remote unit to determine which WANs of the plurality of WANs for the remote unit to use,
   wherein the MNMS uses a common control plane communicably coupled to the remote unit for control and routing of control traffic, including information indicating which WANs of the plurality of WANS to which the remote unit can connect, the common control plane including a single, continuous control channel to which the remote unit is connectable simultaneously with a connection to a WAN of the plurality of WANs.

2. The WAN communication framework of claim 1 wherein the single control channel maintains a session and authentication during a handover while the remote unit switches connections between two WANs of the plurality of WANs when the remote unit can connect to only one of the two WANs at a time.

3. The WAN communication framework of claim 1 wherein the MNMS uses the common control plane to orchestrate WAN connections for the remote unit by establishing physical and network connections between the remote unit and a hub or gateway of a WAN of the plurality of WANS and moving traffic across between the remote and a network accessed by the hub or the gateway.

4. The WAN communication framework of claim 1 wherein the common control plane comprises the single control channel.

5. The WAN communication framework of claim 4 wherein the single control channel comprises a narrowband connection.

6. The WAN communication framework of claim 4 wherein the narrowband connection comprises a L-band or S-band satellite connection.

7. The WAN communication framework of claim 1 wherein the single control channel is continuously available between the remote unit and the MNMS.

8. The WAN communication framework of claim 1 wherein an SD-WAN controller of the remote unit routes traffic over a first link of a first WAN connection of a first of the plurality of WANs prior to a handover to a second link of a second WAN connection of a second of the plurality of WANs and routes traffic over a second link, if already established, when performing the handover, or if only a single WAN connection of a single of the plurality of WANs by the remote unit is available when performing the handover, then routing traffic over the single control channel to maintain any sessions and authentications of the first WAN connection, and thereafter having the SD-WAN controller move the sessions over to the WAN connection of the second link once established to resume transfer of user traffic of the sessions.

9. The WAN communication framework of claim 1 wherein the remote unit comprises an electronically scanned antenna.

10. The WAN communication framework of claim 9 wherein the electronically scanned antenna comprises a flat-panel antenna having a metasurface with a plurality of radio-frequency (RF) radiating antenna elements, a phased array antenna, or a gimballed, parabolic dish antenna.

11. The WAN communication framework of claim 9 wherein the electronically scanned antenna is operable to produce and steer multiple beams.

12. A method comprising:
   communicating as part of a first session, by a remote unit, with a first WAN of a plurality of WANs using a first connection, the plurality of WANs including satellite and terrestrial communication networks;
   communicating concurrently, using a common control plane, with a master network management system (MNMS) that is in communication with hubs and gateways of the plurality of WANs;
   receiving, by the remote unit, a command to connect to a second WAN in the plurality of WANs from the MNMS over the common control plane in response to the MNMS determining availability of a second WAN of the plurality of WANs with characteristics indicating a second connection to the second WAN has a higher priority than the first connection; and
   terminating service with the first WAN and establishing connectivity with the second WAN, including communicating with the MNMS using a single control channel of the common control plane to maintain session and authentication information of the first session during a handover while the remote unit switches connections between the first and second WANs when the remote unit can have only one connection to the first and second WANs at a time.

13. The method of claim 12 wherein the second connection is a next connection after the first connection on a prioritized list of available connections.

14. The method of claim 12 further comprising determining, by the MNMS using one or more parameters and metrics, an alternative connection is available to the remote unit that is a better connection, and performing pre-authorization with respect to the alternative connection to verify the remote terminal is authorized to connect to the second WAN.

15. The method of claim 14 wherein the one or more parameters and metrics are for two or more management systems that control access to two or more WANs of the plurality of WANs.

16. The method of claim 14 further interrogating, by the MNMS, two or more of a plurality of management systems, each for controlling access to and traffic for one of the plurality of WANs, to obtain information regarding the one or more parameters and metrics.

17. The method of claim 14 wherein the one or more parameters and metrics include one or more of downlink power, contention on the beam of interest, potential throughput of a data link, reliability, and latency.

18. The method of claim 17 further comprising combining the one or more parameters and metrics with current position, motion profile, and attitude of the remote unit to create a real-time link budget for a plurality of data links.

19. The method of claim 12 wherein the first connection is a satellite connection to a first satellite, and further wherein the command directs the remote unit to reconfigure itself to support a different frequency, a different waveform and a different tracking algorithm to support connection to a second satellite different than the first satellite.

20. The method of claim 12 wherein the single channel comprises a narrow band connection.

21. The method of claim 20 wherein the narrowband connection comprises a L-band or S-band satellite connection.

22. The method of claim 12 wherein the remote unit is a satellite terminal.

23. A communications terminal comprising:
   an antenna aperture;
   a Software Defined Wide Area Network (SD-WAN) controller having a control plane manager service to manage a common control plane comprising a continuous control channel for exchanging control information with a master NMS to select wide-area networks (WANs) for use during WAN handovers without operator intervention or service disruption involved.

24. The terminal of claim 23 further comprising
   a WAN orchestration service for orchestration of WAN connections, wherein the WAN orchestration service establishes physical and network connections to a hub or gateway associated with one WAN of the WANs and controls movement of traffic across a physical network between the communications terminal and the one WAN associated with the hub or gateway.

* * * * *